United States Patent [19]
Ferris et al.

[11] Patent Number: 5,380,028
[45] Date of Patent: Jan. 10, 1995

[54] DEMOUNTABLE TRAILER SUSPENSION SYSTEM

[75] Inventors: John R. Ferris, 30329 Bristol La., Birmingham, Mich. 48010; Thomas P. Daniels, 755 N. Allen Rd., Port Huron, Mich. 48060

[73] Assignees: John R. Ferris, Birmingham; Thomas P. Daniels, Port Huron, both of Mich.

[21] Appl. No.: 73,879

[22] Filed: Jun. 9, 1993

Related U.S. Application Data

[63] Continuation-in-part of Ser. No. 874,096, Apr. 27, 1992, abandoned.

[51] Int. Cl.$^6$ .............. B60G 11/20; B60G 11/10; B60G 11/16
[52] U.S. Cl. .............. 280/405.1; 280/414.5; 280/43.18; 280/43.2; 280/699; 280/700; 280/701; 280/718; 280/723; 280/725; 280/149.2; 267/278; 267/255; 267/242
[58] Field of Search .......... 280/700, 721, 723, 149.2, 280/656, 43.17, 43.18, 43.19, 43.2, 405.1, 414.5, 699, 701, 718, 725; 267/273, 277, 278, 242, 255

[56] References Cited

U.S. PATENT DOCUMENTS

| | | |
|---|---|---|
| 1,915,134 | 6/1933 | MacPherson . |
| 2,080,546 | 5/1937 | Rudoni ............................ 267/20 |
| 2,141,781 | 12/1938 | Allen ............................. 267/242 |
| 2,148,014 | 2/1939 | Clements ......................... 267/19 |
| 2,556,630 | 6/1951 | Panhard .......................... 280/721 |
| 2,855,212 | 10/1958 | Houser ........................... 280/96.2 |
| 3,054,625 | 9/1962 | Haley ............................. 280/723 |
| 3,165,332 | 1/1965 | Barker, Jr. et al. ............. 280/124 |
| 3,197,233 | 7/1965 | Van Winsen et al. ........... 280/723 X |
| 3,241,855 | 3/1966 | Kersey et al. .................. 280/723 X |
| 3,315,982 | 4/1967 | Svendsen ........................ 280/723 |
| 3,342,505 | 9/1967 | Diehl ............................. 280/43.18 |
| 3,402,940 | 9/1968 | de Coye de Castelet ........ 280/723 |
| 3,432,158 | 3/1969 | Goodwin ........................ 267/57 |
| 3,632,138 | 1/1972 | Whiteley, Jr. .................. 280/405 |
| 3,722,908 | 3/1973 | Whitley, Jr. .................... 280/124 B |
| 3,772,057 | 11/1973 | Whitley, Jr. .................... 117/48 |
| 3,792,875 | 2/1974 | Paden ............................ 280/204 |
| 3,843,149 | 10/1974 | Whitley, Jr. .................... 280/124 B |
| 3,918,739 | 11/1975 | Kirkland ........................ 280/721 |
| 4,033,605 | 7/1977 | Smith et al. .................... 280/664 |
| 4,077,646 | 3/1978 | Watkins ......................... 280/204 |
| 4,140,333 | 2/1979 | Thoraval et al. ............... 280/721 X |
| 4,415,181 | 11/1983 | McCall et al. .................. 280/700 |
| 4,580,808 | 4/1986 | Smith-Williams ............... 280/700 |
| 4,723,790 | 2/1988 | Wharton ........................ 280/700 |
| 4,784,406 | 11/1988 | Stinson ......................... 280/665 |
| 5,098,117 | 3/1992 | Specktor et al. ............... 280/661 |

FOREIGN PATENT DOCUMENTS

| | | | |
|---|---|---|---|
| 0976856 | 6/1964 | Germany .......................... | 280/723 |
| 0214323 | 7/1940 | Switzerland ...................... | 280/700 |

Primary Examiner—Kenneth R. Rice
Assistant Examiner—Peter C. English
Attorney, Agent, or Firm—Barnes, Kisselle, Raisch, Choate, Whittemore & Hulbert

[57] ABSTRACT

A torsion bar suspension system for a trailer that includes a suspension frame having a spindle at one end for rotatably carrying a wheel. The suspension frame is mounted to the trailer frame to pivot about an axis spaced from the wheel axis of rotation. A torsion bar is mounted to the trailer frame between the wheel end of the suspension frame and the suspension frame pivot axis. The torsion bar is operatively coupled to the suspension frame such that torque at the torsion bar resists pivoting of the suspension frame about its pivot axis. The torsion bar/suspension frame coupling comprises an arm of variable length to accommodate changing radius between the torsion bar and the suspension frame as the frame rotates about its pivot axis. The torsion bar and suspension frame are mountable and demountable to and from the trailer frame as an assembly. The suspension frame includes facility for adjusting height, camber and toe-in of the wheel.

23 Claims, 4 Drawing Sheets

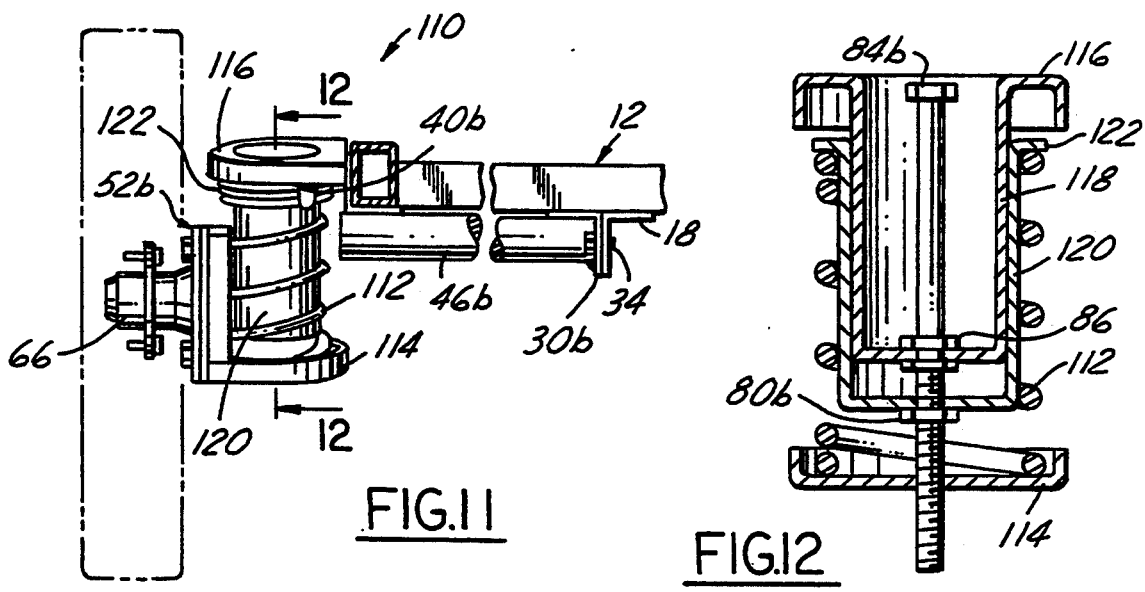
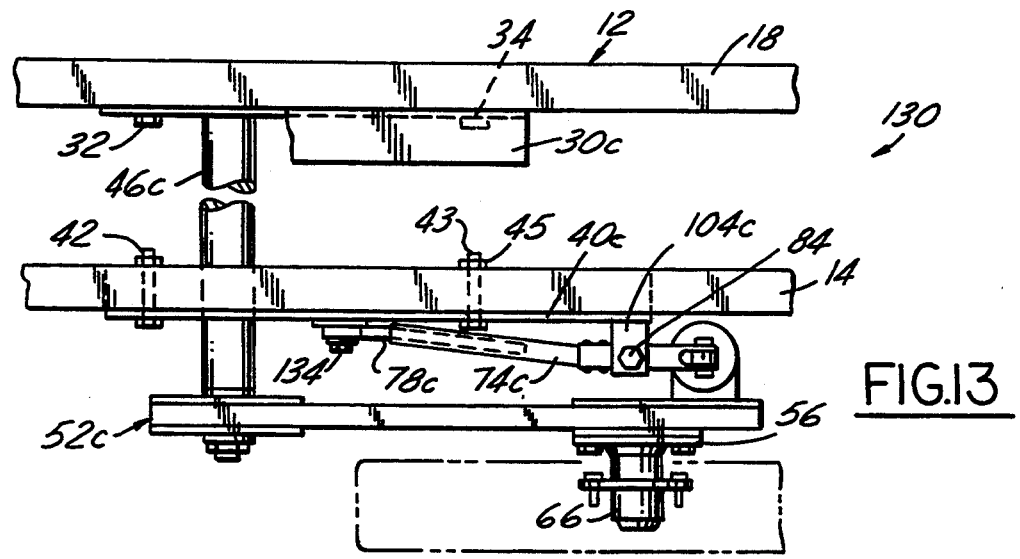
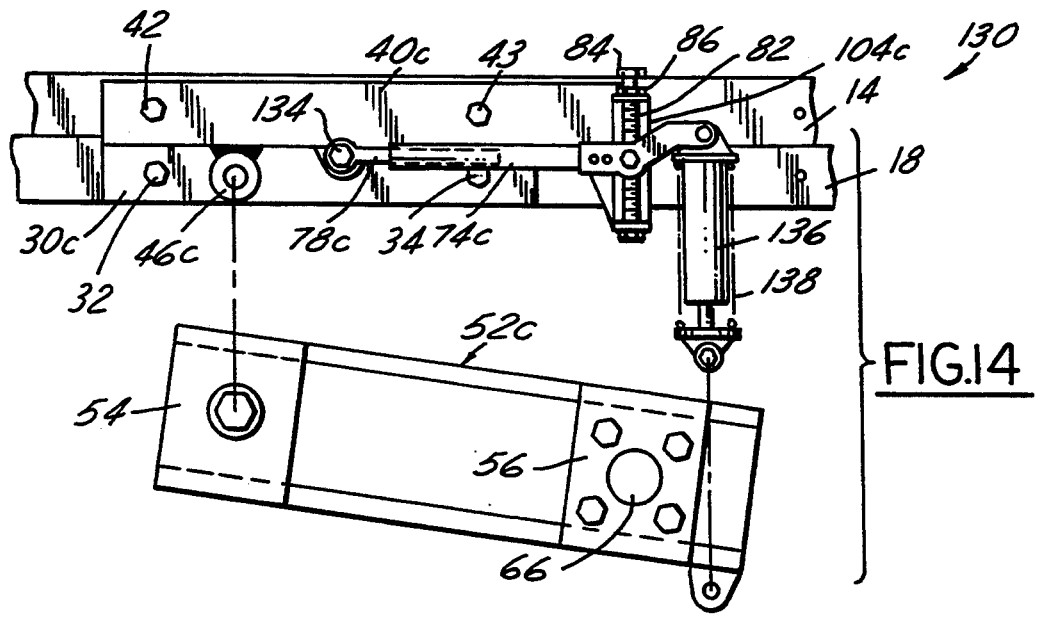

DEMOUNTABLE TRAILER SUSPENSION SYSTEM

This application is a continuation-in-part of application Ser. No. 07/874,096 filed Apr. 27, 1992 now abandoned.

The present invention is directed to suspension systems specifically adapted for use in conjunction with trailers, and more particularly to a sprung system by means of which a plurality of wheels are independently, removably and adjustably suspended from a trailer frame.

BACKGROUND AND SUMMARY OF THE INVENTION

A general object of the present invention is to provide a sprung suspension arrangement by means of which one or more wheels may be independently suspended from a trailer frame. Another object of the invention is to provide a suspension system of the described character in which the one or more wheel suspension arrangements are independently mountable, demountable and/or adjustable with respect to the trailer frame. Yet another object of the invention is to provide a suspension system of the described character in which the height of each wheel suspension is independently adjustable with respect to the trailer frame and with respect to the other wheels. A further object of the invention is to provide a suspension system of the described character in which the camber and toe-in at each wheel is independently adjustable.

A demountable suspension system for a trailer in accordance with one aspect of the present invention includes a suspension arm having a spindle at a first end for rotatable mounting of a vehicle wheel. The suspension arm is pivotally mounted on a support at a second end of the arm spaced from the first end. A suspension spring system is operatively coupled between the suspension arm and the support to resist pivotal motion of the arm with respect to the support. The suspension arm support, suspension arm and spring system are all selectively mountable and demountable as a unit to a trailer frame. Pivotal position of the suspension support arm with respect to the support is selectively adjustable by adjusting the anchor point of the spring system to either the suspension arm or the arm support. In various embodiments of the invention, the spring system comprises a torsion bar spring, a coil spring, a plurality of leaf springs or a shock absorber nested within a coil spring.

A torsion bar suspension system for a trailer having a trailer frame in accordance with one particularly preferred embodiment of the invention includes a suspension arm having a spindle at one end for rotatably carrying a wheel. The suspension arm is mounted to the trailer frame to pivot about an axis spaced from the wheel axis of rotation. A torsion bar is mounted to the trailer frame between the wheel end of the suspension arm and the suspension arm pivot axis. The torsion bar is operatively coupled to the suspension arm such that torque at the torsion bar resists pivoting of the suspension arm about its pivot axis. The torsion bar/suspension arm coupling comprises an arm of variable length to accommodate changing radius between the torsion bar and the suspension arm as the suspension arm rotates about its pivot axis.

The torsion bar/suspension coupling arm in the preferred embodiment of the invention is fastened at one end to the torsion bar and at an opposing end to a nut having threads received on an adjustment screw. The adjustment screw is fastened to the suspension arm and is rotatable with respect thereto about an axis that is orthogonal to the pivot axis of the suspension arm. Rotation of the screw and consequent motion of the nut along the screw body thereby adjusts height of the suspension arm and wheel with respect to the trailer frame.

The suspension arm and torsion bar are selectively mountable and demountable as an assembly to and from the trailer frame. The trailer frame includes laterally spaced supports, and the suspension system is mounted to the supports by an inboard mounting bracket to which the torsion bar is affixed, and an outboard mounting bracket through which the torsion bar rotatably extends. Preferably, a brace is affixed to the inboard and outboard mounting brackets to hold the brackets at parallel positions spaced from each other corresponding to lateral spacing between the inboard and outboard trailer frame supports. The brackets are selectively demountable from the trailer frame for adjusting position of the suspensions and wheels with respect to the frame as a function of trailer load.

BRIEF DESCRIPTION OF THE DRAWINGS

The invention, together with additional objects, features and advantages thereof, will be best understood from the following description, the appended claims and the accompanying drawings in which:

FIGS. 11 and 12 are sectional views taken substantially along the lines 11—11 and 12—12 in FIGS. 10 and 11 respectively;

FIG. 13 is a fragmentary plan view of a shock-in-coil suspension system in accordance with a further embodiment of the invention; and FIG. 14 is an exploded elevational view of the embodiment of the invention illustrated in FIG. 13.

DETAILED DESCRIPTION PREFERRED EMBODIMENTS

Figure 1:
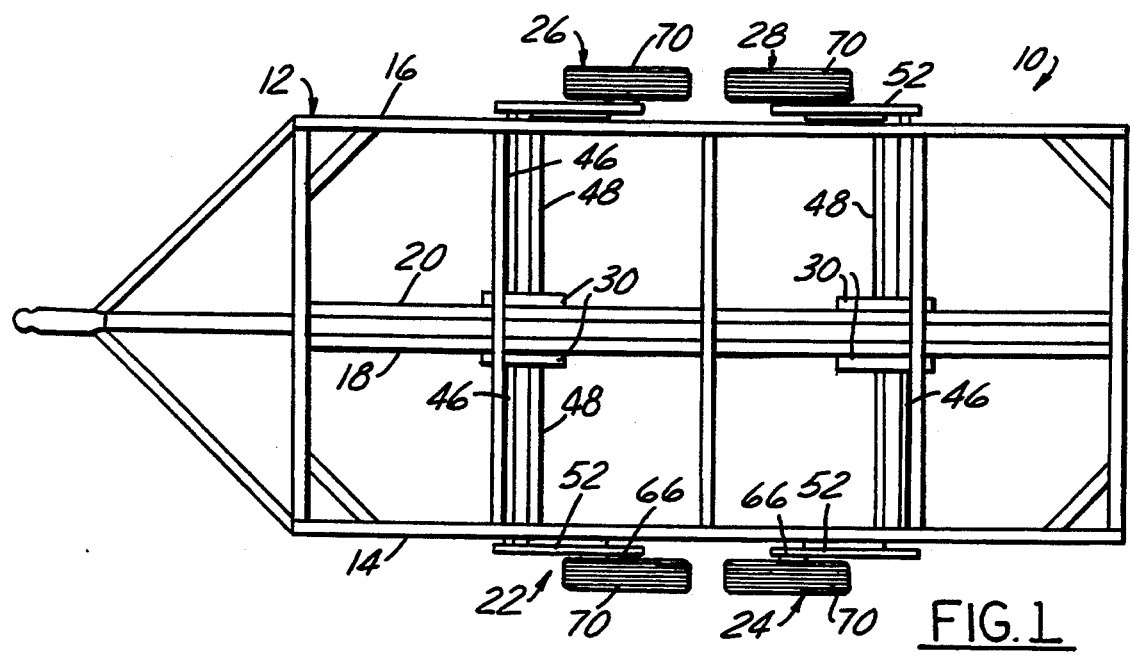
FIG. 1 is a top plan view of a trailer frame and independent suspension system in accordance with one exemplary implementation of the invention.
Figure 2:
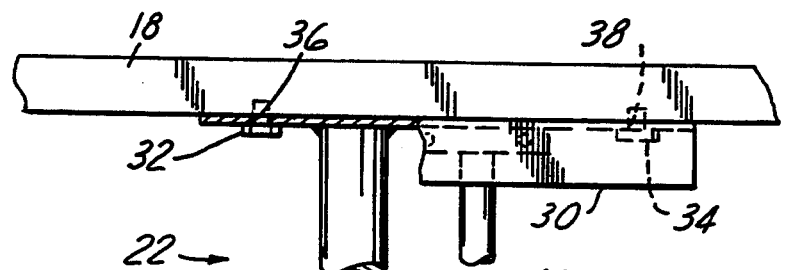
FIG. 2 is a fragmentary view of a portion of FIG. 1 on an enlarged scale illustrating in greater detail a wheel suspension system in accordance with a presently preferred embodiment of the invention.
Figure 3:
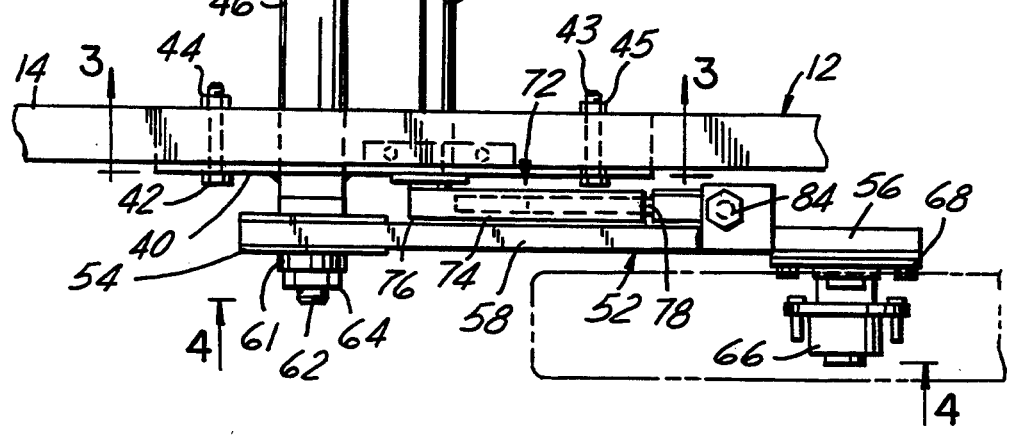
FIGS. 3 and 4 are fragmentary views taken substantially along the respective lines 3—3 and 4—4 in FIG. 2.
Figure 3:
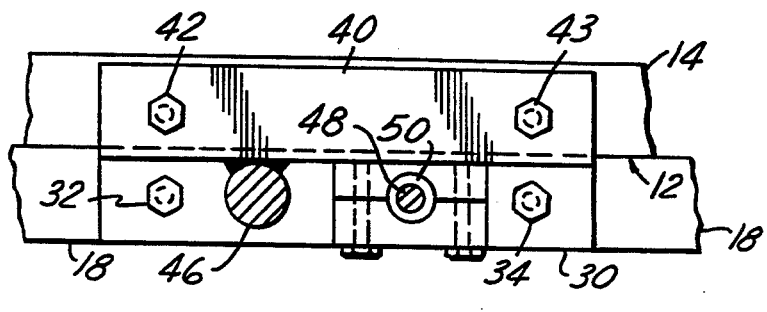
Figure 4:
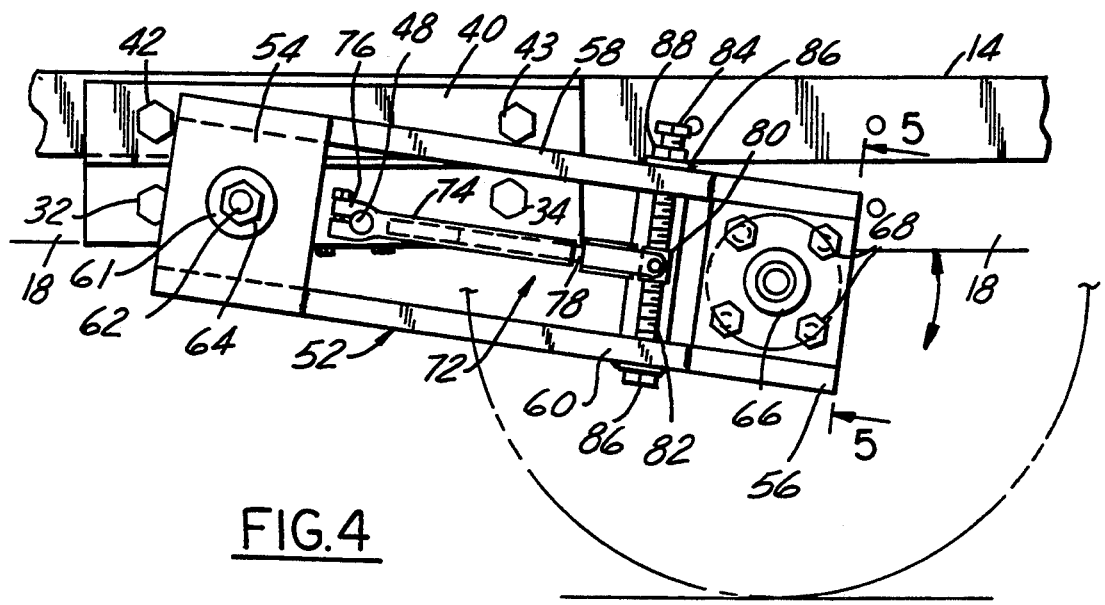
Figure 5:
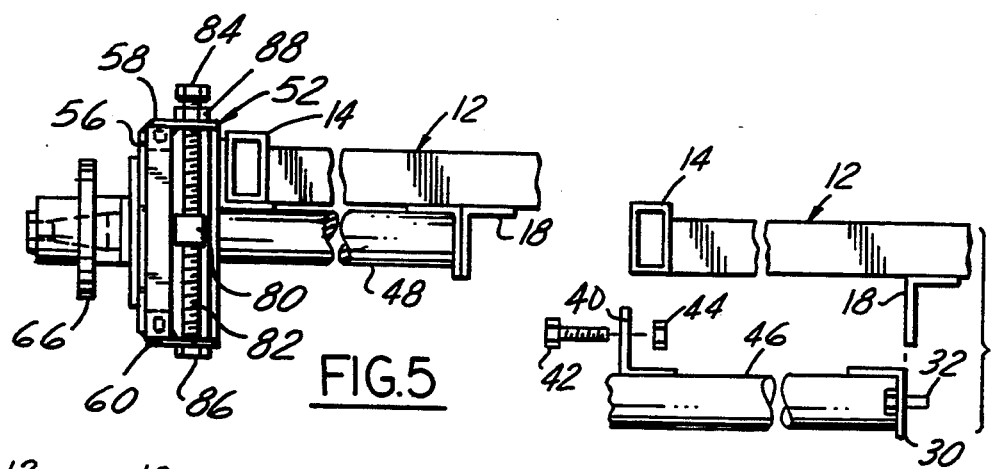
FIG. 5 is an elevational view of the suspension system taken substantially along the line 5—5 in FIG. 4.
Figure 6:
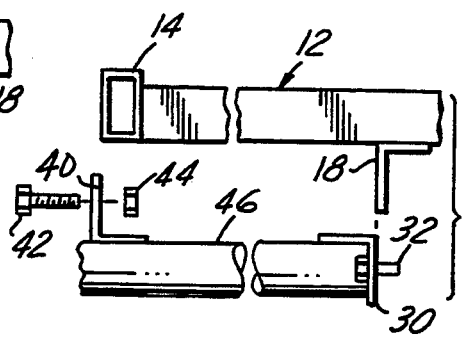
FIG. 6 is a fragmentary exploded elevational view of the suspension system showing the manner in which the system is mountable/demountable as a unit on a trailer frame.

FIG. 1 illustrates a trailer 10 having a frame 12 with laterally spaced side bars 14, 16 and central support bars 18, 20 forming a central trailer frame spine. In the exemplary trailer 10 illustrated in FIG. 1, four wheel suspension assemblies 22, 24, 26, 28 are fastened to frame 12 for suspending trailer 10 for transport over a road surface. Suspension assemblies 22–28 are mounted in laterally opposed pairs 22, 24 and 26, 28 on opposite sides of frame 12. Suspension assemblies 22, 24 are mirror images of each other, and assembly pairs 22, 28 and 24, 26 are identical to each other. As will be described in detail hereinafter, each assembly 22–28 is independently mountable, demountable and adjustable with respect to frame 12, and may be positioned lengthwise of frame 12 in symmetry or non-symmetry on the opposing sides as a function of trailer load. The invention will be described in detail with reference to suspension assembly 22 (and modified embodiments thereof), it being understood that the remaining suspension assemblies 24–28 are either identical or mirror images thereof as previously noted.

Referring to FIGS. 2–6, suspension assembly 22 includes an inboard mounting bracket 30 having longitudinally spaced pins 32, 34 secured thereto for removable receipt into corresponding openings 36, 38 on frame bar 18, which may comprise suitable angle or channel stock. An outboard mounting bracket 40 is mounted by longitudinally spaced bolts 42, 43 and nuts 44, 45 to outboard frame bar 14, which again may comprise suitable channel stock. A brace 46 of suitable tube or bar stock extends between mounting brackets 30, 40. Brace 46 is welded at its inboard end to bracket 30, and extends at its outboard end through bracket 40 being welded or otherwise fixedly secured thereto. It will be noted that bolt 42 is axially aligned with pin 32, and bolt 43 is aligned with pin 34. Bars 14, 18 (as well as bars 16, 20) have a multiplicity of holes longitudinally spaced from each other by suitable incremental distances so that assembly 22 may be adjustably positioned lengthwise of trailer frame 12. Brackets 30, 40 preferably are formed of suitable sheet or angle stock. A torsion bar 48 of suitable bar, tube or other stock is clamped or otherwise fixedly secured at its inboard end to inboard mounting bracket 30. At its outboard end, torsion bar 48 extends through a sleeve bearing 50 on outboard mounting bracket 40 so as to be freely rotatable with respect to the outboard mounting bracket.

A suspension frame or arm assembly 52 includes a pair of plates 54, 56 secured to and spaced from each other by a pair of parallel frame bars 58, 60 to form the rigid rectangular suspension arm frame assembly 52. Plate 54 is freely rotatably received by a sleeve bearing 61 on an extension 62 integrally and coaxially projecting laterally outwardly from brace 46 outboard of mounting bracket 40, being secured at the outboard end of extension 62 by a nut 64 threadably received on the brace extension. A wheel mounting spindle 66 is secured by bolts 68 on plate 56 so as to extend outward from trailer frame 12 for mounting a wheel and tire assembly 70 on the suspension frame. Brace 46 and torsion bar 48 are parallel to each other beneath the plane of frame bars 14, 16 and in the plane of frame bars 18, 20, orthogonal to brackets 30, 40 and frame 52. Spindle 66 is nominally parallel to brace 46 and torsion bar 48. However, camber and toe-in of wheel 70 are freely adjustable by means of suitable spacers or shims positioned in assembly between spindle 66 and plate 56.

An arm 72 couples suspension arm frame 52 to torsion bar 48 so that torque at bar 48 resists pivotal motion of suspension frame 52 about the axis of brace extension 62. Arm 72 comprises a first member 74 in the form of a hollow cylinder fixedly clamped at one end 76 to the outboard end of torsion bar 48. The opposing end of cylindrical member 74 slidably receives a link 78 that is pivotally secured at its opposing end to a nut 80. Nut 80 is threadably received on the body 82 of a screw 84 that is rotatably mounted on arm frame 52 by bearings 86 adjacent to plate 56. The body of screw 82 thus is spaced from and orthogonal to the parallel axes of torsion bar 48 and brace pivot extension 62. A jam nut 88 is threadably received on screw 84 beneath the screw head, and cooperates with the opposing surface of bearing 86 for securing screw 84 in desired adjustment position.

In use, wheel suspension assembly 22 (as well as each assembly 24–28) is first mounted at desired position on trailer frame 12. Mounting brackets 30, 40 are held in fixed parallel positions by brace 46, so that bracket 30 is first secured to trailer frame bar 18 by positioning pins 36 in the desired openings 38. Bracket 40 is then positioned adjacent to outboard frame bar 14 and secured thereto by bolts 42, 43 and nuts 44, 45. Demountability of the suspension assemblies allows a user to reposition the suspensions on both sides of trailer frame 12 symmetrically (as shown) or asymmetrically to accommodate whatever load is to be carried. The demountable suspensions also facilitate use of the trailer body (not shown) and frame as a shipping container, for example, with the wheels and suspensions being disassembled from the container for shipment and then reassembled to the container for transport over the road. In this connection, it will be noted that the suspensions for two (or more) wheels on the trailer are completely independent of each other.

After all wheel suspensions are mounted on the trailer, and either before or after the trailer is loaded, the height of each suspended wheel may be adjusted with respect to the frame by loosening jam nut 88 and rotating screw 84 with respect to suspension frame 52. Nut 80 moves up and down the length of the screw, thereby varying the position of torsion bar coupling arm 72 and the level of spindle 66 with respect to trailer frame 12 and the pivot axis of brace extension 62. In this way, the trailer may be leveled by the operator after the load is placed thereon. Since the axes of brace extension 62 and torsion bar 48 are spaced from each other, link arm 72 is freely extendable/retractable in the lengthwise direction to accommodate a changing radius between the torsion bar and level-adjustment nut 80 as the suspension rotates about its pivot axis.

It will be appreciated that the load adjustment feature of the present invention could be implemented hydraulically rather than by means of screw 82, for example. In this way, adjustment could be made from the cabin of the trailer.

FIGS. 7–14 illustrate three modified embodiments of the invention, in which parts or elements identical to those hereinabove described in connection with the embodiment of FIGS. 2–6 have correspondingly identical reference numerals, and parts or elements having a similar but modified structure and/or function are identified by identical reference numerals with a letter suffix.

Figure 7:
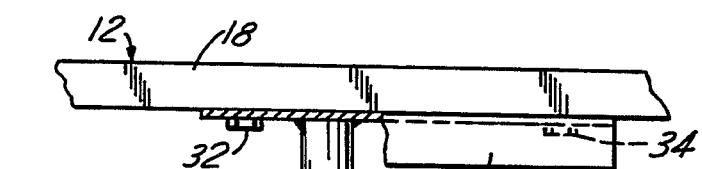
FIG. 7 is a fragmentary plan view of a suspension system with leaf springs in accordance with a modified embodiment of the invention.
Figure 8:
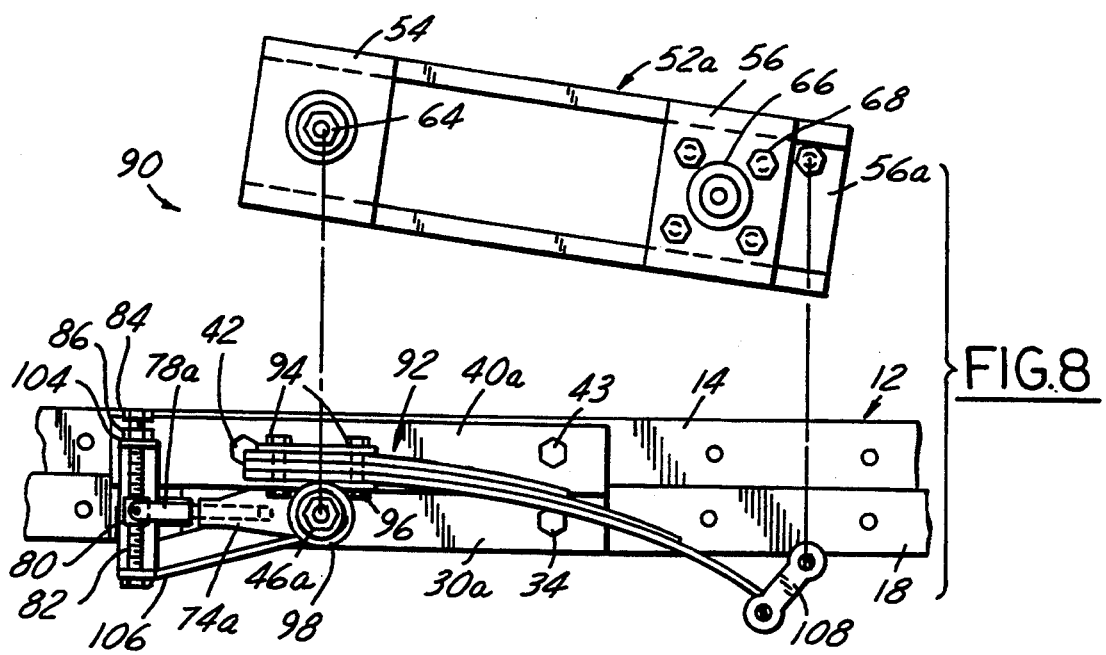
FIG. 8 is an exploded elevational view of the leaf spring suspension system illustrated in FIG. 7.
Figure 9:
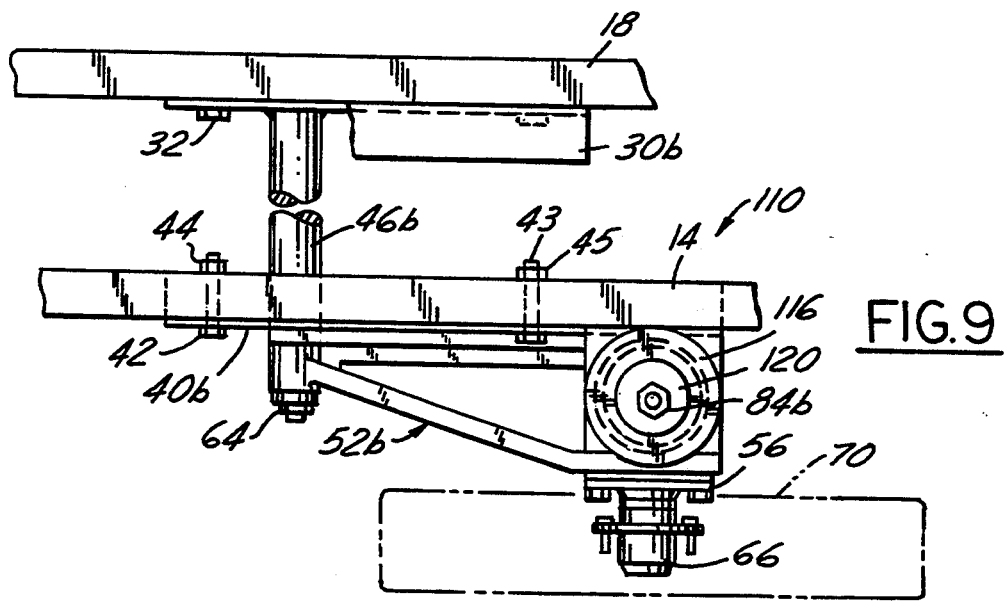
FIG. 9 is a fragmentary plan view of a coil spring suspension system in accordance with yet another embodiment of the invention.
Figure 10:
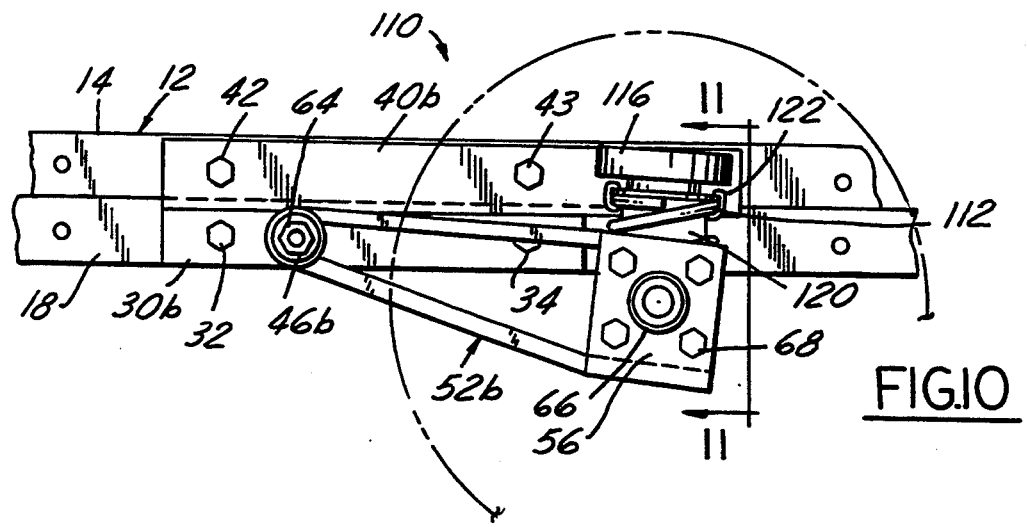
FIG. 10 is an elevational view of the suspension system illustrated in FIG. 9.

FIGS. 7–8 illustrate a leaf spring suspension system 90 in which suspension arm 52a is again pivotally mounted on the outboard end of brace 46a. Between arm 52a and outboard frame rail or bar 14, a set of leaf springs 92 is operatively coupled between the support formed by brackets 30a, 40a and brace 46 on one end, and suspension arm 52a on the other, to resist motion of the suspension arm with respect to the support and frame. Specifically, a set of bolts 94 clamp leaf springs 92 on a platform 96 that has a sleeve 98 pivotally received over brace 46a. An arm 74a extends radially from sleeve 98, and has a pocket that slidably receives a link 78a. Link 78a is pivotally coupled to nut 80 that is threadably received on the body 82 of screw 84. Screw 84 is rotatably mounted on a bracket 104 that is affixed to bracket 40a both directly (FIG. 7) and by an angulated brace 106 (FIG. 8) for enhanced rigidity. Thus, the angular position of sleeve 98 and spring platform 96 with respect to brace 46a and frame 12 is adjustable by rotation of screw 84 as in the prior embodiment. The free end of leaf springs 92 is connected by a shackle 108 to a plate 56a mounted on the free end of suspension arm 52a. Thus, springs 92 resist rotation of suspension arm 52a with respect to brackets 30b, 40b and frame 12. Height of the frame with respect to the wheel is adjustable by means of screw 84 and nut 80 as in the embodiment previously described. Shackle 108 accommodates changing radius of springs 92 as suspension arm 52a rotates about the axis of brace 46a.

FIGS. 9–12 illustrate a third embodiment 110 of the present invention in which a coil spring 112 resists rotation of suspension arm 52b with respect to brackets 30b, 40b and trailer frame 12. A spring base 114 is internally affixed to the free end of suspension arm 52b—i.e., the end of arm 52b remote from its pivot axis at brace 46b. An outer spring cup 116 is affixed to bracket 40b. Spring cup 116 has a central cylindrical depression 118 that externally slidably receives an inner spring cup 120. Coil spring 112 is captured in compression between support 114 and a flange 122 on cup 120.

A screw 84b is freely rotatably carried coaxially within cup 116, and threadably engages a nut 80b affixed to the base of cup 120. Thus, with cup 116 affixed to bracket 30b and frame 12, rotation of screw 84b adjusts compression of spring 112, and thereby adjusts position of the wheel and tire assembly carried by spindle 66 with respect to the level of trailer frame 12.

FIGS. 13 and 14 illustrate a nested shock absorber and coil suspension system 130 in accordance with yet another embodiment of the invention. Suspension arm 52c is again pivotally mounted to the outboard end of brace 46c. A link 78c is pivotally mounted by a bolt 134 beneath outboard bracket 30c, and is slidably received within a cylindrical pocket on an arm 74c. A shock absorber 136 is disposed between the free end of suspension arm 52c and the opposing end of arm 74c, being pivotally mounted to each. A coil spring 138 is captured in compression between arm 52c and arm 74c surrounding shock absorber 136. Between link 78c at one end and shock absorber 136 at the other, arm 74c is pivotally mounted to nut 80 that is threadably received on the body 82 of screw 84, which in turn is rotatable in a bracket 104c carried by bracket 40c. Thus, as in the other embodiments of the invention, spring 138 and shock absorber 136 resist rotation of suspension arm 52c with respect to the support formed by brackets 30c, 40c and brace 46c, which in turn are affixed to trailer frame 12. The angular position of suspension arm 52c, and therefore the height of the tire and wheel assembly carried thereby, is adjustable with respect to the trailer frame by means of screw 84 as in the embodiments discussed above.

There have thus been described four embodiments of the present invention in which the suspension system is sprung by a torsion bar 48 (FIGS. 1–6), a set of leaf springs 92 (FIGS. 7–8), a coil spring 112 (FIGS. 9–12), and the combination of a coil spring 138 and a shock absorber 136 (FIGS. 13–14). Each embodiment includes facility for adjusting height of the suspension system by adjusting the anchor point of the spring either to the support structure (FIGS. 7–14) or to the support arm (FIGS. 1–6). In each embodiment, the suspension arm, spring, adjustment mechanism and underlying support structure are mountable, demountable and adjustable as a unit with respect to the trailer frame.

We claim:

1. A demountable suspension system in combination with a trailer having a trailer frame, said system comprising:

a first suspension assembly including a first suspension arm having means at a first end for rotatably supporting a first wheel, first arm support means with means for pivotally supporting a second end of said first arm spaced from said first end, and first spring means operatively coupled between said first arm and said first support means to resist pivotal motion of said first arm with respect to said first support means, a second suspension assembly separate from said first suspension assembly, said second suspension assembly comprising a second suspension arm having means at a first end for rotatably supporting a second wheel, second arm support means with means for pivotally supporting a second end of said second arm spaced from said first end, and second spring means operatively coupled between said second arm and said second support means to resist pivotal motion of said second arm with respect to said second support means, and means for selectively mounting and demounting each of said first and second suspension assemblies on respective laterally opposed sides of the trailer frame independently of each other lengthwise of the trailer frame, the trailer frame having a pair of longitudinally extending inboard frame segments and a pair of outboard frame segments disposed on laterally opposed sides of the trailer frame laterally outwardly of and parallel to the inboard frame segments, said first arm support means of said first suspension assembly including inboard and outboard first support means, and a first brace fixedly securing said inboard and outboard first support means at a spacing corresponding to the spacing between the inboard and outboard trailer frame segments, and said second arm support means of said second suspension assembly including inboard and outboard second support means, and a second brace fixedly securing said inboard and outboard second support means at the same said spacing, said means for selectively mounting and demounting each of said first and second suspension assemblies comprising a multiplicity of openings on each of said inboard and outboard frame segments spaced from each other lengthwise of the frame segments and means coupled to each of said support means for engaging said openings in said inboard and outboard frame segments on laterally opposed sides of the trailer frame at plural positions lengthwise of the frame independently of each other, said means coupled to each of said first and second arm support means comprising pins fixedly secured to and extending from each of said inboard first and second support means, said multiplicity of openings being disposed on each lateral side of the inboard frame segments of the trailer frame, such openings on each lateral side of the inboard trailer frame segments being longitudinally spaced from each other and adapted to removably receive said pins at plural positions of said inboard first and second support means lengthwise of the trailer frame and independent of each other.

2. The system set forth in claim 1 further comprising means operatively coupled between each of said first and second arm support means and the associated said first and second arm for adjustably pivotally positioning each said arm with respect to the associated said support means and independently of each other.

3. The system set forth in claim 2 wherein said means for adjustably pivotally positioning each said arm comprises means for adjustably positioning the associated said first and second spring means relative to said first and second arm support means.

4. The system set forth in claim 3 wherein said means for adjustably pivotally positioning each said first and second arm comprises means for adjusting force of the associated said first and second spring means resisting pivotal motion of said arm.

5. The system set forth in claim 3 wherein said first and second spring means each respectively comprises a torsion bar carried by the associated said first and second support means and having one end affixed to said support means, and means for coupling a second end of each said torsion bar to the first end of the associated said first and second suspension arm.

6. The system set forth in claim 5 wherein each said torsion bar is parallel to and offset from said means for pivotally supporting said second ends of said first and second suspension arms, and wherein said means for coupling each said torsion bar to said first ends of said suspension arms comprises means for permitting a length of said coupling means to vary to accommodate changing radius between each said torsion bar and said first ends of said first and second suspension arms as said suspension arms pivot about said first and second arm support means.

7. The system set forth in claim 6 wherein said means coupling said torsion bars to said first ends of said first and second suspension arms each comprises a cylinder coupled to one of said torsion bars and said first ends, and a link slidable in said cylinder and coupled to the other of said torsion bar and said first end.

8. The system set forth in claim 7 wherein one of said link and said cylinder is coupled to said first end of each said suspension arm by a screw rotatably carried by said suspension arm adjacent to said first end and a nut threadably carried by said screw.

9. The system set forth in claim 3 wherein each said first and second spring means comprises at least one leaf spring, means affixing one end of each said leaf spring to the associated said first and second support means, and means coupling a second end of each said leaf spring to said first ends of said first and second suspension arms.

10. The system set forth in claim 9 wherein said means affixing said one end of each said leaf spring to the associated said support means comprises means mounting said one end of said leaf spring to pivot coaxially with said second end of suspension arm, and means for adjusting pivotal position of one end of said leaf spring with respect to said support means.

11. The system set forth in claim 10 wherein said means mounting said one end of each said leaf spring comprises a platform pivotally coupled to the associated said support means, and wherein said means for adjusting pivotal position of said leaf spring comprises a screw rotatably carried by said support means, a nut threadably mounted on said screw and means coupling said platform to said nut.

12. The system set forth in claim 3 wherein each said first and second spring means comprises a coil spring, means mounting one end of said coil spring to the associated said support means and means coupling a second end of said coil spring to said first end of the associated said suspension arm.

13. The system set forth in claim 12 wherein each said spring mounting means includes means for adjusting compression of the associated said spring.

14. The system set forth in claim 12 wherein each said means mounting said one end of said coil spring to the associated said support means comprises a screw affixed to said support means, a nut threaded onto said screw and means coupling said nut to said one end of said coil spring.

15. The suspension system set forth in claim 1 wherein said means for rotatably mounting said wheels includes means for adjusting camber and toe-in of the wheels.

16. The system set forth in claim 1 wherein said means coupled to each of said first and second arm support means further comprises means for removably securing each of said outboard first and second support means independent of each other to the outboard trailer frame segments at a multiplicity of discrete positions lengthwise of the trailer frame corresponding to positions of said openings in said inboard frame segments.

17. The system set forth in claim 16 wherein said removably securing means comprises a pair of spaced openings in each of said outboard first and second support means, said multiplicity of openings in each of the outboard trailer frame segments being spaced from each other by incremental distances corresponding to spacing between said openings in said outboard first and second support means, and threaded fastening means for securing each of said outboard first and second support means to the corresponding outboard frame segment through aligned openings in said outboard first and second support means and the outboard frame segments.

18. The system set forth in claim 17 wherein said pins comprise a pair of spaced pins fixedly secured to each of said inboard first and second support means, and wherein said multiplicity of openings on each lateral side of said inboard trailer frame segments are spaced from each other by incremental distances corresponding to the spacing between said pins.

19. A torsion bar suspension system for a trailer having a trailer frame, said system comprising:
suspension means including means for rotatably mounting a wheel at one end thereof,
means for mounting said suspension means to the trailer frame to pivot about an axis spaced from said one end,
torsion bar means including means for mounting said torsion bar means to the trailer frame between said one end and said pivot axis, and a coupling arm operatively connecting said suspension means to said torsion bar means such that torque at said torsion bar means resists pivoting of said suspension means about said axis, said coupling arm including means for permitting a length of said coupling arm to vary during use to accommodate changing pivot radius of said suspension means with respect to said torsion bar as said suspension means pivots about said pivot axis while maintaining torsional coupling of said suspension means to said torsion bar means.

20. The suspension system set forth in claim 19 wherein said coupling arm comprises first means coupled to one of said torsion bar means and said suspension means, and second means slidably coupled to said first means and coupled to the other of said torsion bar means and said suspension means.

21. A torsion bar suspension system for a trailer having a trailer frame, said system comprising:
suspension means including means for rotatably mounting a wheel at one end thereof,
means for mounting said suspension means to the trailer frame to pivot about an axis spaced from said one end,
torsion bar means including means for mounting said torsion bar means to the trailer frame between said one end and said pivot axis, and
means operatively coupling said suspension means to said torsion bar means such that torque at said torsion bar means resists pivoting of said suspension means about said axis, said coupling means including means for adjusting position of said suspension means about said axis comprising an arm coupled at one end to said torsion bar means, a screw rotatably mounted on said suspension means orthogonal to said axis and spaced from said torsion bar means, and a nut mounted on said screw and operatively coupled to an opposing end of said arm, such that rotation of said screw with respect to said suspension means adjusts position of said nut and angle of said suspension means with respect to said axis and said torsion bar means, said arm having a length that automatically varies to accommodate changing pivot radius of said suspension means with respect to said torsion bar.

22. The suspension system set forth in claim 21 wherein said arm comprises a cylinder coupled to one of said torsion bar means and said nut, and a link slidable in said cylinder and coupled to the other of said torsion bar means and said nut.

23. A torsion bar suspension system in combination with a trailer having a trailer frame, said system comprising:
suspension means including means for rotatably mounting a wheel at one end thereof,
means for mounting said suspension means to the trailer frame to pivot about an axis spaced from said one end,
torsion bar means including means for mounting said torsion bar means to the trailer frame between said one end and said pivot axis,
means operatively coupling said suspension means to said torsion bar means such that torque at said torsion bar means resists pivoting of said suspension means about said axis,
said means for mounting said suspension means and said torsion bar means to the trailer frame comprising means for selectively mounting and demounting said suspension means, said torsion bar means and said coupling means as an assembly to and from the trailer frame,
the trailer frame including laterally spaced inboard and outboard support means, said selectively mounting means comprising first means for fixedly mounting an inboard end of said torsion bar means to said inboard support means on the trailer frame and second means for securing an outboard end of said torsion bar means as well as said suspension means to said outboard support means on the trailer frame,
said first means comprising inboard mounting means to which said torsion bar means is secured against rotation, and said second means comprising outboard mounting means through which said torsion bar means rotatably extends for coupling to said suspension means by said coupling means,
said first means further comprising pins on said inboard mounting means for removable receipt in openings in the inboard support means on the trailer frame, and said second means further comprising means for removably fastening said outboard mounting means to the outboard support means on the trailer frame, a brace fixedly secured to said inboard and outboard mounting means and holding said mounting means spaced from each other by a distance corresponding to lateral separation between the inboard and outboard laterally spaced support means on the trailer frame, said brace extending between said mounting means parallel to said torsion bar means, and said means mounting said suspension means to the trailer comprising an extension on said brace for pivotally mounting said suspension means thereon,
said suspension means comprising a frame mounted at one end to said extension, said frame having a pair of parallel frame arms with said coupling means being disposed between said arms, and said means for rotatably mounting a wheel being on the opposing end of said frame.

* * * * *